United States Patent [19]

Alberts

[11] 4,054,280

[45] Oct. 18, 1977

[54] SPRING BOX ASSEMBLY FOR USE IN CLAMPING MECHANISMS OF THE OVER-CENTER TYPE

[75] Inventor: Russell Alberts, Sikeston, Mo.

[73] Assignee: Noranda Mines Limited, Toronto, Canada

[21] Appl. No.: 745,689

[22] Filed: Nov. 29, 1976

[51] Int. Cl.² .......... B23Q 3/08

[52] U.S. Cl. .......... 269/34; 269/157; 269/224; 269/238; 269/254 CS; 269/285

[58] Field of Search .......... 269/285, 224, 157, 160, 269/238, 32, 34; 254/93 R, 124

[56] References Cited

U.S. PATENT DOCUMENTS

| | | | |
|---|---|---|---|
| 2,311,525 | 2/1943 | Ebbs | 269/285 |
| 3,292,903 | 12/1966 | Meyer et al. | 254/124 |

*Primary Examiner*—Robert C. Watson
*Attorney, Agent, or Firm*—Fleit & Jacobson

[57] ABSTRACT

A spring box assembly for use in clamping mechanisms of the over-center type comprises two nested metal housings, at least one spring located between such housings, and means for resiliently holding said housings together with a predetermined initial tension applied to the spring. In a preferred embodiment, at least one metal pin is secured at one end to the bottom of the inside housing and slip fitted in holes in the outside housing at its other end, a helical spring is located around such pin and means are mounted on the other end of such pin for holding the two nested housings together with a predetermined initial tension applied to such spring.

5 Claims, 5 Drawing Figures

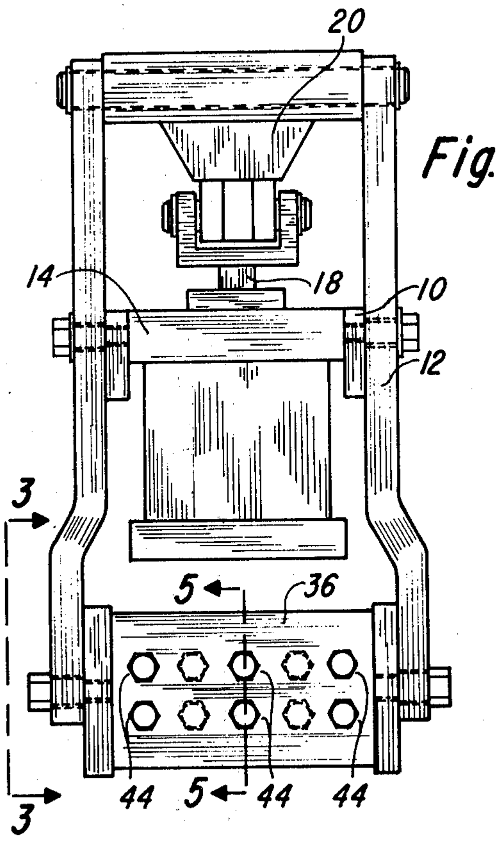
Fig. 2
Fig. 3
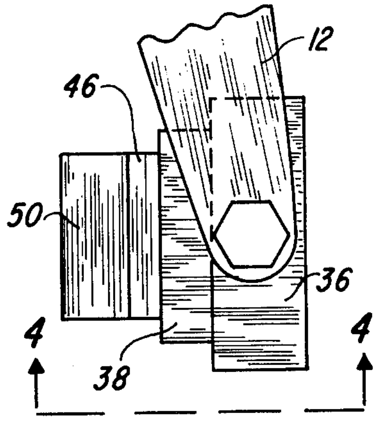
Fig.4
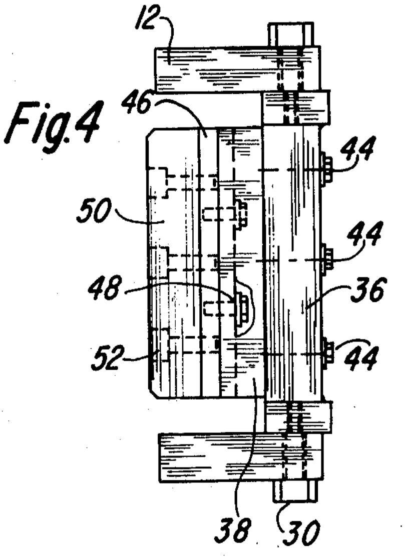
Fig.5
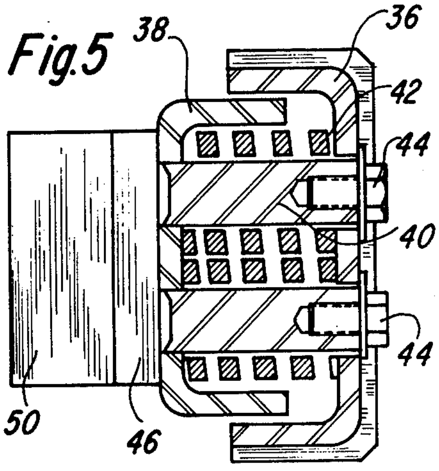

SPRING BOX ASSEMBLY FOR USE IN CLAMPING MECHANISMS OF THE OVER-CENTER TYPE

This invention relates to a spring box assembly for use in a clamping mechanism of the over-center type.

BACKGROUND OF THE INVENTION

As commonly known, clamping mechanisms of the over-center type are used in many applications where it is important that a loss of air or oil pressure in the cylinder operating the clamping mechanism will not result in release of the mechanism. This requires spring loaded clamps as one method of solution for effective travel past a dead center position with sufficient residual load generated by the springs in the clamp to hold the work. The normal spring box assembly consists of a sandwich construction of a clamp block backed by die springs located inside a spring box attached to the pivot linkages of the clamping mechanism. Stripper bolts are used through the springs to hold the spring box assembly together.

In certain applications, such as in clamping mechanisms for supporting the anodes of an electrolytic cell for the production of aluminum as disclosed in U.S. Pat. No. 3,484,856 issued Dec. 16, 1969, the anode rods have inherent positional variations; they are bent after several cycles of operation, and they may be slightly angled during installation. Therefore, the clamp blocks often hang up on the anode rod sides during installation. This generates high direct shear and eccentric shear loads which must be resisted by the stripper bolts. Therefore, a high incidence of stripper bolt breakage has resulted when using the above spring box assembly in the clamping mechanisms of the over-center type.

SUMMARY OF THE INVENTION

It is therefore the object of the present invention to provide a novel spring box for use in clamping mechanisms of the over-center type which does not have the above drawback.

The spring box assembly, in accordance with the invention, comprises two nested metal housings, preferably made of structural steel, at least one spring located between said housings, and means for resiliently holding said housings together with a predetermined tension being applied to such spring.

In a preferred embodiment of the invention, at least one metal pin, preferably made of steel, is secured at one end to the bottom of a first one of the nested housings and slip fitted in holes in the second one of such nested housings, a helical spring is located around such pin and means are mounted on the other end of such pin for holding the two nested housings together with a predetermined initial tension applied to such spring.

The clamping mechanism uses a pair of the above spring boxes and normally comprises two spaced support members, two pivot linkages pivotally mounted one at each end of each support member, a hydraulic or air cylinder secured between said support members at a point midway between any two of the pivot linkages, two arms having one end pivotally connected to the piston of the cylinder and each other end pivotally connected to the respective one end of one of the pivot linkages of each pair. Each other end of one of the pivot linkages of each pair is pivotally connected to respective ends of the second housing of one of such pair of spring boxes. A clamping block is secured to the first housing of each pair of spring boxes for contacting the work.

BRIEF DESCRIPTION OF THE DRAWINGS

The invention will now be disclosed with reference to a preferred embodiment thereof disclosed by way of examples in the accompanying drawings in which

FIG. 2 illustrates a sideview of a clamping mechanism similar to the one of FIG. 1 but using a spring box assembly in accordance with the invention;

FIG. 3 illustrates a partial sideview of FIG. 2 as seen from the direction indicated by lines 3—3;

FIG. 4 illustrates a partial bottom view of the spring box assembly of FIG. 3 taken in the direction indicated by lines 4—4; and FIG. 5 illustrates a section view taken along line 5—5 of FIG. 2.

DETAILED DESCRIPTION

Figure 1:
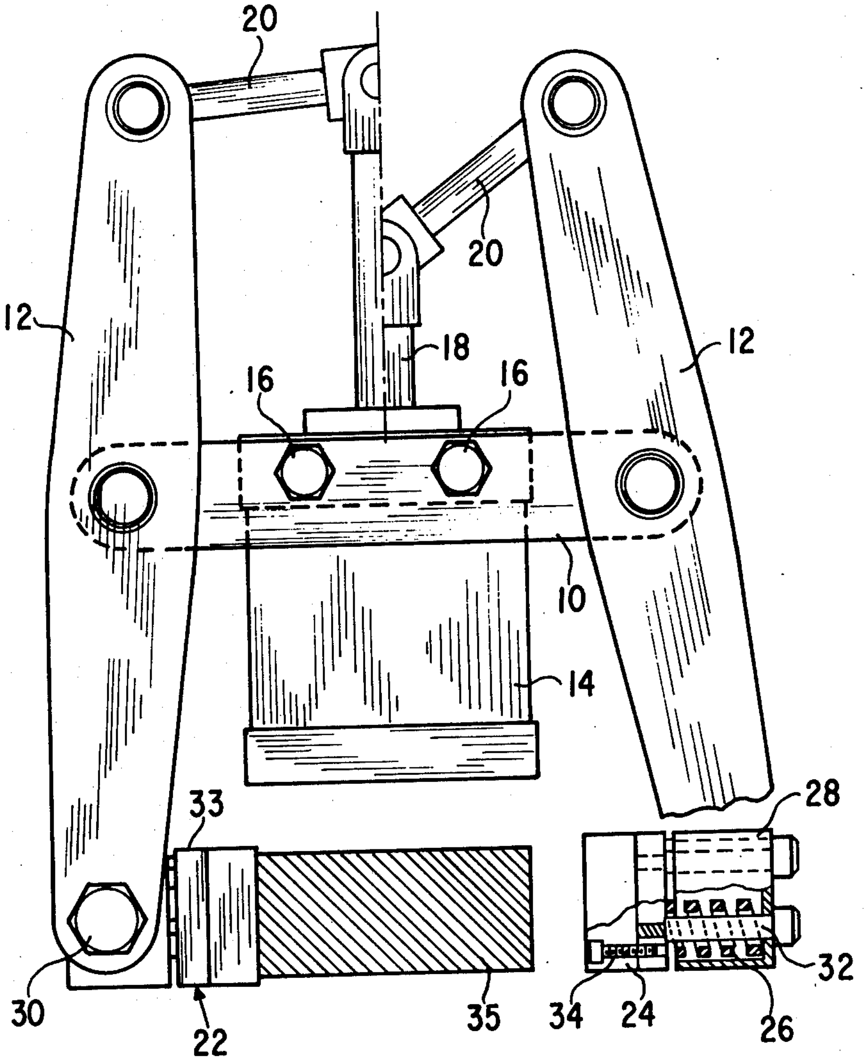
FIG. 1 illustrates a clamping mechanism using a conventional spring box assembly.

Referring to FIG. 1, there is shown a front view of a conventional clamping mechanism comprising a support member 10 at each end of which are pivotally mounted pivot linkages 12. An air or oil cylinder 14 is secured to support member 10 by any suitable means such as bolts 16. An additional support member 10 and a corresponding pair of pivot linkages 12 are located on the opposite side of the cylinder as shown in FIG. 2. The piston 18 of cylinder 14 is pivotally connected to one end of two arms 20. The other end of each arm 20 is pivotally connected to respective one end of one pivot linkage 12 of each pair. The other end of one pivot linkage of each pair is pivotally connected to respective ends of a spring box assembly 22. Each spring box assembly is formed of a clamp block 24 backed by die springs 26 located in a spring box 28. The spring box is attached to pivot linkage 12 by bolt 30 whereas the clamp block 24 is secured to the spring box by means of stripper bolts 32 which are threaded into a base member 33 itself secured to clamp block 24 by means of bolts 34. The die springs 26 are located around the stripper bolts 32 and a predetermined initial tension applied to such springs when securing the clamp block to the spring box.

In operation, the piston moves out of the cylinder 14 from the position illustrated on the right hand side of FIG. 1 to the position illustrated on the left hand site of FIG. 1 which is slightly passed a dead center position wherein the two arms 20 would be in alignment. The length of arms 20 is set so that the operation of the cylinder will grip the work 35 between the two clamp blocks 24. In so doing, the springs 26 will be compressed and then slightly released as the two arms 20 pass through alignment but there will be sufficient residual force exerted by the springs in the clamp to hold the work 35.

As mentioned previously, a high incidence of stripper bolt breakage has been encountered in certain applications with this type of spring box design and it has become desirable to modify the design of the spring box assembly.

FIG. 2 illustrates a side view of the clamping mechanism of FIG. 1 provided with the spring box assembly in accordance with the invention. As illustrated more clearly in FIGS. 3, 4 and 5, the spring box design comprises two nested rectangular structural steel housings 36 and 38. Steel pins 40 are welded or otherwise secured at one end to the bottom of inside housing 38 and are slip fitted in holes in the outside housing 36. A spring 42 is located around each steel pin. Short cap screws 44 hold the housings together with an initial tension being applied on the springs 42. The inside housing 38 is secured to a base member 46 by bolts 48 and a clamp block 50 is secured to the base member 46 by bolts 52.

In the above embodiment, the spring nested housings function as flexible links with variable center-to-center distance between pivot points to allow for the over-center action of the clamping mechanism in the same manner as the embodiment of FIG. 1. However, the spring locating pins align the assembly and are subjected only to the minor bending stress resulting from their deflection to the point where the two nested housings come in contact and transfer the side loads, which deflection is equal to the side clearance between the outside and inside nested housings. The screws are subjected only to the initial spring tension load. Thus, the use of the nested housings as the main load carrying elements eliminates the bolt breakages experienced with the conventional spring box design.

Although the invention has been disclosed with reference to a preferred embodiment thereof, it is to be understood that various modifications may be made to such embodiment within the scope of the invention. For example, the nested housings need not be rectangular and may take various forms. The housings and pins may be made of any strong metal and necessarily not steel. Also, other means may be used to resiliently attach the two nested housings together with a predetermined initial tension being applied to the springs biasing the two housings apart.

What is claimed is

1. In a clamping mechanism of the over-center type including a support member; two pivot linkages pivotally mounted, one at each end of said support member; a hydraulic or air cylinder secured to said support member between said pivot linkages; two arms having one end pivotally connected to the piston of said cylinder and each other end pivotally connected to a respective one end of the pivot linkages; and a spring box assembly secured to the other end of each pivot linkage; the improvement being wherein said spring box assembly comprises a. two nested metal housings, one being pivotally connected to said other end of the pivot linkage and the other being secured to a clamping block;

b. at least one spring located between said housings for biasing said housings apart; and c. means for resiliently holding said housings together with a predetermined initial tension applied to said spring.

2. A spring box assembly as defined in claim 1, wherein said means for resiliently holding said housings together comprises at least one metal pin having one end secured to the inside of the first one of said nested housings and slip fitted in holes in the second one of said nested housings, said pin being inserted through said spring.

3. A spring box assembly as defined in claim 2, wherein said inside housing is secured to a base member and further comprising a clamp block secured to said base member.

4. A spring box assembly for use in a clamping mechanism of the over-center type comprising a. two nested metal housings;

b. at least one spring located between said housings;

c. means for resiliently holding said housings together with a predetermined initial tension applied to said spring; wherein said means for resiliently holding said housings together comprises at least one metal pin having one end secured to the inside of the first one of said nested housings and slip fitted in holes in the second one of said nested housings, said pin being inserted through said spring; wherein said inside housing is secured to a base member; further comprising a clamp block secured to said base member; and still further comprising two spaced support members, two pivot linkages pivotally mounted one at each end of each support member, a hydraulic or air cylinder secured between said support members at a point midway between any two of said pivot linkages, two arms having one end pivotally connected to the piston of said cylinder and each other end pivotally connected to respective one end of one of the pivot linkages of each pair, the other end of one of the pivot linkages of each pair being pivotally connected to respective ends of the second housing of one of said pair of spring boxes, and a clamping block secured to the first housing of each of said paid of spring boxes.

5. A clamping mechanism as defined in claim 4, wherein said inside housing is secured to a base member and wherein said clamp block is secured to said base member.

* * * * *